United States Patent
Skriletz (10) Patent No.: US 8,473,910 B2
(45) Date of Patent: Jun. 25, 2013

(54) METHOD AND SYSTEM FOR DEFINING A SOFTWARE APPLICATION AS A COMPLETE AND CONSISTENT SPECIFICATION IN A SOFTWARE DEVELOPMENT PROCESS

(75) Inventor: Richard A. Skriletz, Portland, OR (US)

(73) Assignee: Infonovus Technologies, LLC, Portland, OR (US)

(*) Notice: Subject to any disclaimer, the term of this patent is extended or adjusted under 35 U.S.C. 154(b) by 1181 days.

(21) Appl. No.: 12/189,300

(22) Filed: Aug. 11, 2008

(65) Prior Publication Data

US 2009/0094573 A1 Apr. 9, 2009

Related U.S. Application Data

(60) Provisional application No. 60/954,927, filed on Aug. 9, 2007.

(51) Int. Cl.
*G06F 9/44* (2006.01)
*G06F 9/45* (2006.01)

(52) U.S. Cl.
USPC ............................ 717/123; 717/105; 717/109

(58) Field of Classification Search
USPC .................................. 717/104–110, 121–123
See application file for complete search history.

(56) References Cited

U.S. PATENT DOCUMENTS

| | | | | |
|---|---|---|---|---|
| 5,287,511 A | * | 2/1994 | Robinson et al. | 717/106 |
| 5,875,330 A | * | 2/1999 | Goti | 717/104 |
| 5,875,333 A | | 2/1999 | Fish et al. | |
| 6,230,309 B1 | * | 5/2001 | Turner et al. | 717/107 |
| 6,349,404 B1 | | 2/2002 | Moore et al. | |
| 6,374,308 B1 | * | 4/2002 | Kempf et al. | 719/316 |
| 6,389,588 B1 | | 5/2002 | Wadhwa et al. | |
| 6,473,748 B1 | | 10/2002 | Archer | |
| 6,601,233 B1 | | 7/2003 | Underwood | |
| 6,721,941 B1 | | 4/2004 | Morshed et al. | |
| 6,757,887 B1 | | 6/2004 | Kaplan et al. | |
| 6,789,252 B1 | | 9/2004 | Burke et al. | |
| 6,889,371 B1 | * | 5/2005 | Teig et al. | 716/126 |
| 6,889,375 B1 | * | 5/2005 | Chan et al. | 717/123 |
| 6,898,783 B1 | * | 5/2005 | Gupta et al. | 717/105 |
| 7,047,518 B2 | | 5/2006 | Little et al. | |
| 7,114,149 B2 | * | 9/2006 | Aptus et al. | 717/123 |
| 7,197,739 B2 | * | 3/2007 | Preston et al. | 717/106 |

(Continued)

OTHER PUBLICATIONS

Jiang et al, "Comparing design and code metrics for software quality prediction", ACM PROMISE, pp. 11-18, 2008.*

(Continued)

*Primary Examiner* — Anil Khatri
(74) *Attorney, Agent, or Firm* — Holland & Knight LLP; Brian J. Colandreo, Esq.; Michael T. Abramson, Esq.

(57) ABSTRACT

A method and system include capturing one or more process flow definitions that define, at least in part, a software application. One or more user interface definitions that define, at least in part, an interface to the software application are captured. One or more data definitions that define, at least in part, data used within the software application are captured. One or more rules for validating at least part of the software application are captured. A design definition is captured as a specification wherein the design definition includes: the one or more process flow definitions, the one or more user interface definitions, the one or more data definitions, and the one or more rules.

16 Claims, 2 Drawing Sheets

U.S. PATENT DOCUMENTS

| | | | |
|---|---|---|---|
| 7,213,232 B1 | 5/2007 | Knowles | |
| 7,346,888 B1* | 3/2008 | Srinivasan et al. | 717/105 |
| 7,424,701 B2* | 9/2008 | Kendall et al. | 717/105 |
| 7,428,724 B2* | 9/2008 | Pike et al. | 717/105 |
| 7,496,888 B2 | 2/2009 | Sanjar et al. | |
| 7,533,366 B2* | 5/2009 | Gupta et al. | 717/105 |
| 7,543,274 B2* | 6/2009 | Hinchey et al. | 717/123 |
| 7,640,251 B2* | 12/2009 | Sundararajan et al. | 1/1 |
| 7,694,272 B2* | 4/2010 | Bronicki et al. | 717/109 |
| 7,730,446 B2* | 6/2010 | Anonsen et al. | 717/104 |
| 7,752,606 B2* | 7/2010 | Savage | 717/135 |
| 7,886,041 B2* | 2/2011 | Outhred et al. | 709/224 |
| 7,890,924 B2 | 2/2011 | Raffo | |
| 7,945,892 B1* | 5/2011 | Kainz et al. | 717/105 |
| 8,001,527 B1* | 8/2011 | Qureshi et al. | 717/120 |
| 8,006,224 B2* | 8/2011 | Bateman et al. | 717/104 |
| 8,015,541 B1* | 9/2011 | Srinivasan et al. | 717/104 |
| 8,024,703 B2* | 9/2011 | Gerken et al. | 717/109 |
| 8,037,453 B1* | 10/2011 | Zawadzki | 717/123 |
| 8,086,995 B2* | 12/2011 | Luo et al. | 717/105 |
| 8,103,536 B2* | 1/2012 | Green et al. | 705/7.27 |
| 8,117,597 B2* | 2/2012 | Shia | 717/123 |
| 8,176,465 B2 | 5/2012 | Dutta et al. | |
| 8,307,330 B2* | 11/2012 | Kumar et al. | 717/109 |
| 8,370,798 B2* | 2/2013 | Broadfoot et al. | 717/107 |
| 8,392,876 B2* | 3/2013 | Austin et al. | 717/105 |
| 8,413,115 B1* | 4/2013 | Surprise et al. | 717/121 |
| 2002/0091989 A1 | 7/2002 | Cole et al. | |
| 2004/0111428 A1 | 6/2004 | Rajan et al. | |
| 2005/0033588 A1 | 2/2005 | Ruiz et al. | |
| 2005/0144226 A1 | 6/2005 | Purewal | |
| 2005/0172263 A1 | 8/2005 | Hariharan et al. | |
| 2005/0172270 A1 | 8/2005 | Dathathraya et al. | |
| 2005/0210099 A1 | 9/2005 | Oswalt | |
| 2005/0235260 A1 | 10/2005 | Matsutsuka et al. | |
| 2007/0089103 A1 | 4/2007 | Iborra et al. | |
| 2008/0040364 A1 | 2/2008 | Li | |

OTHER PUBLICATIONS

Matinlassi, "Comparision of software product line architecture design methods: COPA, FAST, FORM, KobrA and QADA", IEEE ICSE, pp. 1-10, 2004.*

Popovici et al, "Platform based software design flow for heterogeneous MPSoC", ACM Trans. on Embedded Sys. vo. 7, No. 4, article 39, pp. 1-23, 2008.*

Oyamada et al, "Software performance estimation in MPSoC Design", IEEE, pp. 38-43, 2007.*

Giglielmo et al, "Model driven design and validation of embedded software", ACM AST, pp. 98-104, 2011.*

Jensen et al, "On the use of generic programming for automated refactoring and the introduction of design patterns", ACM GECCO, pp. 1341-1348, 2010.*

International Preliminary Report on Patentability with Written Opinion, mailed Feb. 24, 2011, received in international patent application No. PCT/US09/053396, 7 pgs.

Mano, Nobuoki, Modeling of Data-Processing Software for Generating and Reusing Their Programs, IEEE, 1988, pp. 231-240.

Solsi, et al., Simple Yet Complete Heuristics for Transforming Data Flow Diagrams into Booch Style Diagrams, Ada Letters, Mar./Apr. 1991, vol. XI, No. 2, pp. 115-127.

Conradi, et al., Information Model of a Compound Graph Representation for System and Architecture Level Design, IEEE, 1995, pp. 22-27.

Ray, Arnab, Architectural Interaction Diagrams: AIDs for System Modeling, IEEE, 2003, pp. 396-406.

Ji, et al., Interactive Software Architecture Design with Modeling & Simulation, ACM, 2004, pp. 305-306.

Abdi, et al., Automatic Generation of Equivalent Architecture Model from Functional Specification, ACM, 2004, pp. 608-613.

Abdi, et al., On Deriving Equivalent Architecture Model from System Specification, IEEE, 2004, pp. 322-327.

Ge, et al., An Architecture Modeling and Code Generation Framework for Configuration Management Systems, ACM, 2005, pp. 427-428.

Liu, et al., Mapping Concern Space to Software Architecture: A Connector-Based Approach, ACM, 2005, 5 pgs.

Mahfoudhi, et al., Towards a User Interface Generation Approach Based on Object Oriented Design and Task Model, ACM, 2005, pp. 135-142.

Rueher, et al., "Capturing Software Processes Through the Generated Objects", (1988), pp. 148-152.

International Search Report and Written Opinion of the International Searching Authority received in PCT/US2009/053396, mailed Sep. 24, 2009 (9 pgs.).

* cited by examiner

METHOD AND SYSTEM FOR DEFINING A SOFTWARE APPLICATION AS A COMPLETE AND CONSISTENT SPECIFICATION IN A SOFTWARE DEVELOPMENT PROCESS

RELATED APPLICATION

This application claims the priority of U.S. Provisional Application No. 60/954,927, filed on 9 Aug. 2007, which is incorporated here by reference in its entirety.

TECHNICAL FIELD

This disclosure relates to software, more particularly to capturing a software application as a specification.

BACKGROUND

The construction of software applications is time intensive and resource heavy. Companies often hire software developers to create and maintain software applications for use within their environment. For example, a manager in a medical facility may wish to utilize an application that automates the scheduling of medical procedures in order to save time and money. However, the manager may find that no suitable commercial application exists. In order to procure a suitable application, the manager and the medical facility may be forced to develop their own, custom application by hiring software developers to create the application.

Software, such as an application that automates the scheduling of medical procedures, may exist as part of a larger design definition that incorporates the actions of patients, doctors, and medical staff. The actions of these non-application software entities may constitute an important aspect of the design definition that can affect the design of the application software. Yet these actions often excluded from application software requirements.

A typical software development process will likely include, at a minimum, a specification capture phase where software requirements are gathered, a development phase where the software is written, and a test phase where the software is tested. The process is time consuming and costly especially, as is often the case, where a company has a need for multiple custom applications or requires modifications to a custom application. The natural result of the process will likely be a custom software application tailored to a specific need, but not one that is flexible or re-usable; the company will have to invest additional time and resources to make any changes to the custom application or to create a new application.

A system and method that can automate at least part of the design definition and/or application specification process may speed the development cycle and require fewer resources to produce more flexible, re-usable results.

SUMMARY OF DISCLOSURE

In an embodiment, a method includes: capturing one or more process flow definitions that define, at least in part, a software application; capturing one or more user interface definitions that define, at least in part, an interface to the software application; capturing one or more data definitions that define, at least in part, data used within the software application; capturing one or more rules for validating at least part of the software application; and capturing a design definition as a specification wherein the design definition includes: the one or more process flow definitions; the one or more user interface definitions; the one or more data definitions; and the one or more rules.

One or more of the following features may be included. One or more design elements may be generated based, at least in part, on one or more of: the one or more process flow definitions; the one or more user interface definitions; the one or more data definitions; and the one or more rules. Capturing the design definition as a specification may include capturing the one or more design elements as at least part of the specification. The one or more data definitions may include one or more items selected from the group consisting of: user interface data elements; an organization chart that identifies, at least in part, operating units and their hierarchy; a work location that identifies, at least in part, a physical work facility; and a functional hierarchy that defines the functional components of the software design. The one or more rules may be selected from the group consisting of: a rule for controlling the operation of a design definition; a rule for determining the completeness of the design definition; a rule for determining the consistency of the design definition. The one or more process flow definitions include one or more process actions. The one or more process actions may be selected from the group consisting of: a manual process action; an interactive process action; and an automated process action. The one or more process actions may be associated with one or more of the group consisting of: an operating unit; a work location; a process action trigger; a user interface definition; data; a data relationship; and a validation rule.

The method may also include: validating that the specification is a complete specification; validating that the specification is a consistent specification; and validating that the specification is a controlled specification.

The method may also include generating one or more simulation definitions that define, at least in part, one or more simulations of the software application; wherein the design definition further includes the one or more simulation definitions.

In another embodiment, a computer program product resides on a computer readable medium, having a plurality of instructions stored thereon, which, when executed by a processor cause the processor to perform operations including: capturing one or more process flow definitions that define, at least in part, a software application; capturing one or more user interface definitions that define, at least in part, an interface to the software application; capturing one or more data definitions that define, at least in part, data used within the software application; capturing one or more rules for validating at least part of the software application; and capturing a design definition as a specification wherein the design definition includes: the one or more process flow definitions; the one or more user interface definitions; the one or more data definitions; and the one or more rules.

One or more of the following features may be included. One or more design elements may be generated based, at least in part, on one or more of: the one or more process flow definitions; the one or more user interface definitions; the one or more data definitions; and the one or more rules. Capturing the design definition as a specification may include capturing the one or more design elements as at least part of the specification. The one or more data definitions may include one or more items selected from the group consisting of: user interface data elements; an organization chart that identifies, at least in part, operating units and their hierarchy; a work location that identifies, at least in part, a physical work facility; and a functional hierarchy that defines the functional components of the software design. The one or more rules may be selected from the group consisting of: a rule for controlling the operation of a design definition; a rule for determining the completeness of the design definition; a rule for determining the consistency of the design definition. The one or more process flow definitions include one or more process actions. The one or more process actions may be selected from the group consisting of: a manual process action; an interactive process action; and an automated process action. The one or more process actions may be associated with one or more of the group consisting of: an operating unit; a work location; a process action trigger; a user interface definition; data; a data relationship; and a validation rule.

The operations may also include: validating that the specification is a complete specification; validating that the specification is a consistent specification; and validating that the specification is a controlled specification.

The operations may also include generating one or more simulation definitions that define, at least in part, one or more simulations of the software application; wherein the design definition further includes the one or more simulation definitions.

BRIEF DESCRIPTION OF THE DRAWINGS

Like numbers denote like elements in the drawings.

DETAILED DESCRIPTION OF THE PREFERRED EMBODIMENTS

Overview:

As will be discussed in greater detail, this disclosure may take the form of an entirely hardware embodiment, an entirely software embodiment or an embodiment containing both hardware and software elements. In a preferred embodiment, this disclosure may be implemented in software, which may include but is not limited to firmware, resident software, microcode, byte-code, script code, markup language code, etc.

Furthermore, this disclosure may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device). Examples of a computer-readable medium include: a semiconductor or solid state memory, magnetic tape, a removable computer diskette, a random access memory (RAM), a read-only memory (ROM), a flash memory, a rigid magnetic disk, and an optical disk. Current examples of optical disks may include, but are not limited to, compact disc—read only memory (CD-ROM), compact disc—read/write (CD-R/W), DVD—read only memory (DVD-ROM), and DVD—read/write memory (DVD-RW).

A data processing system and/or computing device suitable for storing and/or executing program code may include at least one processor coupled directly or indirectly to memory elements through a system bus. The memory elements may include local memory employed during actual execution of the program code, bulk storage, and cache memories.

Input/output or I/O devices (including but not limited to keyboards, displays, pointing devices, voice recognition, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
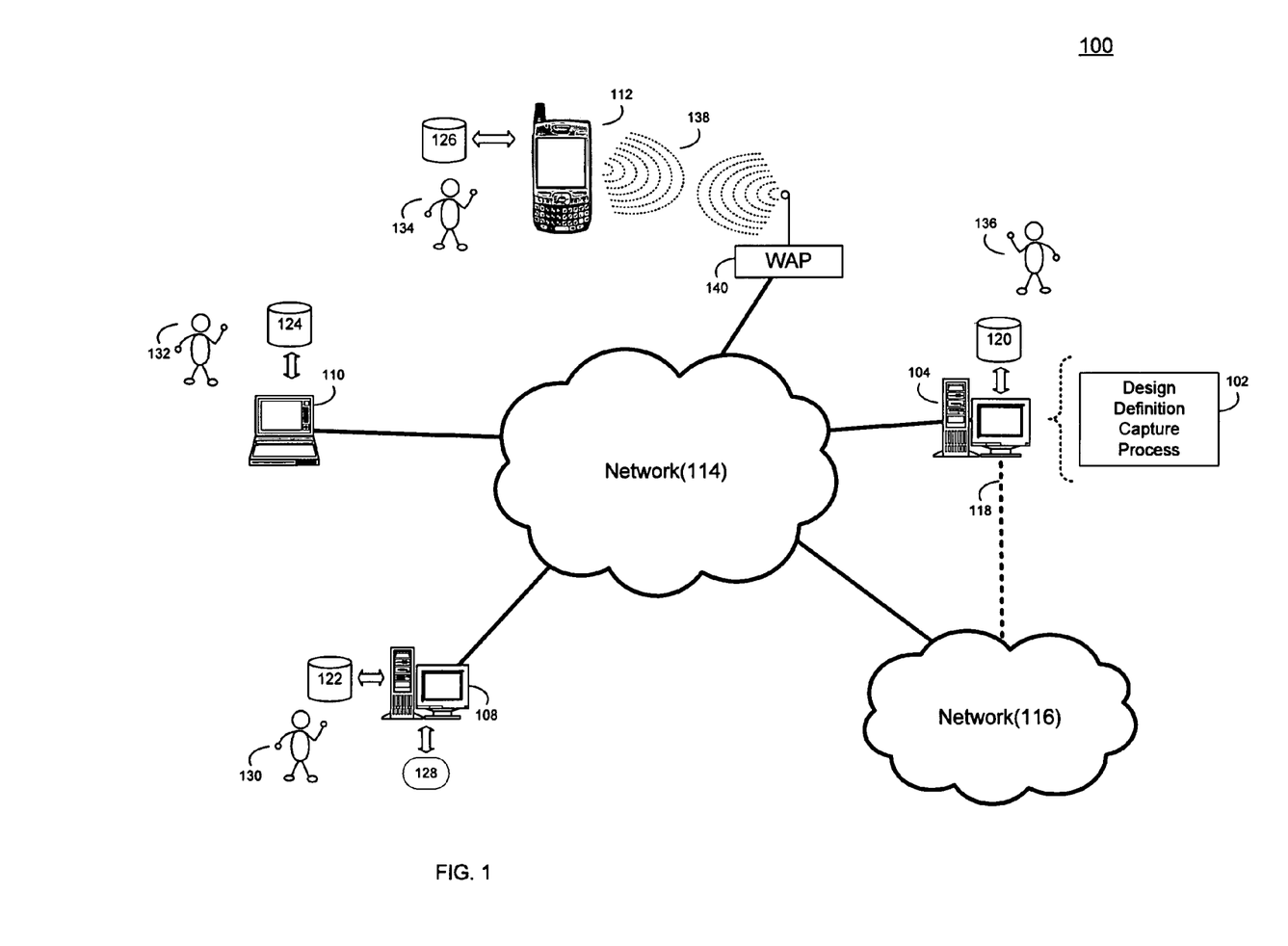
FIG. 1 is a diagrammatic view of a design definition capture process executed in whole or in part by a computer coupled to a distributed computing network.

Referring to FIG. 1, FIG. 1 depicts a method and system 100 for capturing a design definition as a specification. Design definition capture process 102, which may be resident on and executed (in whole or in part) by server computer 104, is shown and may be operative to capture a design definition. A design definition may include requirements and definitions of a software application and/or a software design. As will be discussed in greater detail, design definition capture process 102 may capture a design definition as a specification.

Server computer 104 may be a single server computer, a plurality of server computers, or a general purpose computer, for example. Design definition capture process 102 may be resident on and executed by server computer 104 (as shown in FIG. 1), or on desktop computer 108, laptop computer 110, and/or computing device 112. Design definition capture process 102 may be wholly or partially resident on any computing device or any combination of computing devices including, but not limited to, desktop computer 108, laptop computer 110, computing device 112, and/or server computer 104, etc. Design definition capture process 102 may also be resident on and executed by any type of computing device including, but not limited to, a laptop computer, desktop computer, server computer, personal digital assistant (PDA), smart-phone, cellular telephone, cable box, television, gaming console, office telephone, MP3 player, calculator, tablet PC, supercomputer, mainframe, minicomputer, bar code reader, RFID device, or any other type of computing device. As will be discussed below in greater detail, design definition capture process 102 may capture design definition 112 as a specification.

Server computer 104 may be coupled to distributed computing network 114 (e.g., a LAN, a WAN, and/or the Internet). Server computer 104 may be, for example, a web server running a network operating system, examples of which may include but are not limited to Microsoft Windows XP Server™, Unix™, OS/X™, or Redhat Linux™.

Network 114 may be coupled to one or more secondary networks (e.g., network 116), such as: a local area network; a wide area network; an internet; the World Wide Web; or an intranet, for example. Additionally/alternatively, server computer 104 may be coupled to network 114 through secondary network 116, as illustrated with phantom link line 118. Although not shown, any computing device may also be coupled to network 114 through secondary network 116 through a link line, such as phantom link line 118.

The instructions and subroutines of design definition capture process 102, which may be stored on storage device 120 coupled to server computer 104, may be executed by one or more processors (not shown) and one or more memory architectures (not shown) incorporated into server computer 104. Additionally, the instructions and subroutines of design definition capture process 102 may be stored wholly or partially on storage devices 122, 124, 126. Storage devices 120, 122, 124, 126 may include, but are not limited to, hard disk drives, tape drives, optical drives, RAID arrays, random access memories (RAM), read-only memories (ROM), compact flash (CF) storage devices, secure digital (SD) storage devices, memory stick storage devices, CDs, DVDs, etc. The instructions and subroutines of design definition capture process 102 may cause one or more computer processors (not shown) to perform operations based on the instructions and subroutines.

Design definition capture process 102 may also access and make use of a data store, such as data store 128 coupled to desktop computer 108. Data store 128 may be a database, which may reside in a file or files on desktop computer 108. Desktop computer 108 may execute database software such as Microsoft SQL Server™, mySQL™ or Oracle Database 11g™, or any other form of database. Alternatively, data store 128 may be a custom database, such as a flat file database or an XML database. Although FIG. 1 depicts data store 128 coupled to desktop computer 108, data store 128 may reside on and/or be coupled to any computing device including, but not limited to: server computer 104, laptop computer 110, computing device 112, and/or any other computing device. Design definition capture process 102 may access data store 128 remotely through networks 114, 116, or directly if data store 128 is resident on a computing device local to design definition capture process 102. Although not shown, design definition capture process 102 may access multiple data stores (not shown). The multiple data stores may be resident on a single computing device or on a plurality of computing devices.

Users, such as users 130, 132, 134, 136, may access design definition capture process 102 locally, directly through network 114, or through secondary network 116 by interfacing with server computer 104, desktop computer 108, laptop computer 110, computing device 112, or any other computing device, for example. Users 130, 132, 134, 136 may also access design definition capture process 102 through a local computing device. Design definition capture process 102 may include one or more user interfaces, such as browsers and textual or graphical user interfaces, through which users 130, 132, 134, 136 may access design definition capture process 102.

The computing devices (e.g., server computer 104, desktop computer 108, laptop computer 110, and computing device 112) may be physically or wirelessly coupled to network 114 (or network 116). For example, server computer 104 is shown directly coupled to network 114 via a hardwired network connection. Desktop computer 108 is also shown directly coupled to network 114 via a hardwired network connection. Computing device 112 is shown wirelessly coupled to network 114 via wireless communication channel 138 established between computing device 112 and wireless access point ("WAP") 140, which is shown directly coupled to network 114. WAP 140 may be, for example, an IEEE 802.11a, 802.11b, 802.11g, 802.11n, Wi-Fi, and/or Bluetooth device that is capable of establishing wireless communication channel 138 between computing device 112 and WAP 140.

Design Definition Capture Process

Figure 2:
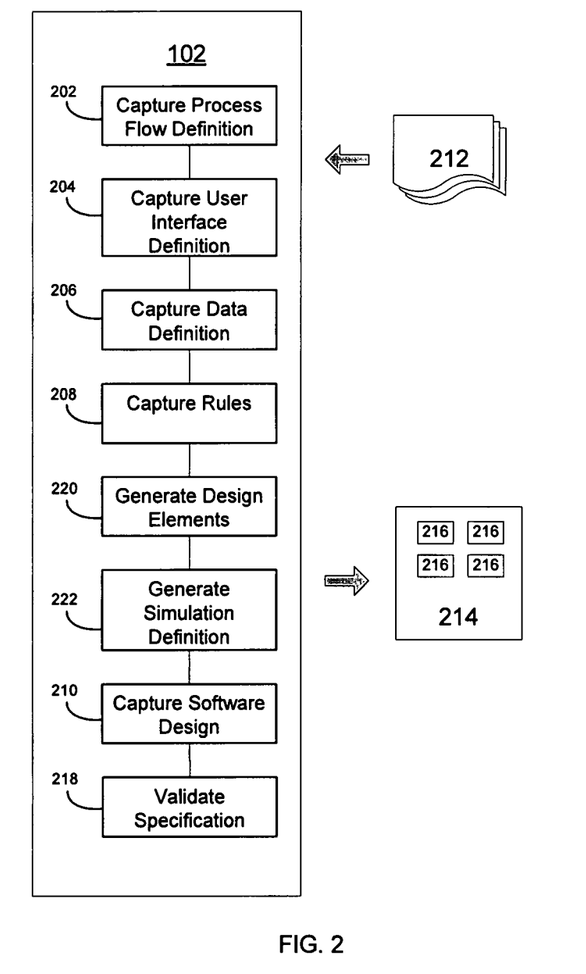
FIG. 2 is a flowchart overview of the design definition capture process of FIG. 1.

Referring now to FIG. 1 and FIG. 2, design definition capture process 102 may capture 202 one or more process flow definitions that define, at least in part, a software application; capture 204 one or more user interface definitions that define, at least in part, an interface to the software application; capture 206 one or more data definitions that define, at least in part, data used within the software application; capture 208 one or more rules for validating at least part of the software application; and capture 210 design definition 212 as specification 214 wherein design definition 212 includes the one or more process flow definitions, the one or more user interface definitions, the one or more data definitions, and the one or more rules.

Specification 214 may include one or more design elements 216. Specification 214 may, for example, be used to automatically generate a software application. For example, specification 214 may capture and/or describe design definition 212 and/or a software application defined by design definition 212 sufficiently to allow automated generation of the software application described in design definition 214, thus limiting or eliminating the need for manual generation and/or coding of the software application by software developers.

Design definition capture process 102 may receive design definition 212 as input. Design definition 212 may include input data, for example. The input data may be manual input from a user, such as users 130, 132, 134, 136, for example. The input data may also be electronic data, such as data from a data file, a database, an input stream, a document, or any other form of data input. The input data may be generated by a data input process or program. For example, a custom input program may be accessed by users 130, 132, 134, 136. The custom input program may take input data from users 130, 132, 134, 136 and provide input data to design definition capture process 102. The input data entered by users 130, 132, 134, 136 may be part of a software application design and may be included as part of design definition 212, for example. Alternatively, a custom input program may read data from a data source (data store 128, or a document, e.g.) and provide input data to design definition capture process 102 from the data source. The input data may be included as at least part of design definition 212 and may be used to create specification 214.

Design definition 212 may contain information about one or more process flows, i.e. one or more process flow definitions. Design definition capture process 102 may capture 202 the one or more process flow definitions. Design definition capture process 102 may also ensure that the one or more process flow definitions are consistent. For example, a process action included in a process flow may be one of three types: manual, or performed by a person without the use of a computer; automated, or performed by a computer without the assistance of a person; and interactive, or performed by a person using a computer.

Design definition 212 may also contain information about one or more user interfaces, i.e. one or more user interface definitions. Design definition capture process 102 may capture 204 the one or more user interface definitions. In a preferred embodiment, a user interface definition may be required to be consistent with a process action. For example, a requirement may exist so that a manual process may not interact with a web page. As another example, a requirement may exist so that an automated process may not receive printed paper as input.

Capturing 204 the one or more user interface definitions may also include capturing a visual presentation layout of a UI. Capturing the visual presentation layout of a UI may include capturing data and text contained in the visual presentation layout of the UI, capturing a presentation sequence of the data and relationships between data contained in the visual presentation layout of a UI, and/or capturing other components of the visual presentation layout of a UI including, but not limited to: buttons, windows, tabs, and other interactive formats, UI events (e.g. mouse clicks), etc. Design definition capture process 102 may capture 204 the visual presentation layout of a UI as at least part of one or more user interface definitions.

Design definition 212 may also contain one or more data definitions that define, at least in part, data used within a software application. Design definition capture process 102 may capture 206 the one or more data definitions as specification 214. The one or more data definitions may include the definitions of data including, but not limited to: characteristics of data such as size and form, security requirements of the data such as encryption when stored, access rights by user groups, and retention requirements, or any other characteristic of the data. The one or more data definitions may be captured 206 as part of specification 214. The one or more data definitions may also be captured as one or more design elements 216 within specification 214.

Design definition 212 may also contain information about one or more rules, i.e. validation rules, to validate data of a software application. Design definition capture process 102 may capture 208 the one or more rules as at least part of specification 214. The one or more rules may be captured as one or more design elements 216 within specification 214, for example. The one or more rules may include data validation rules that may be used to validate data of a software application. For example, if a software application is used to schedule a hysterectomy, a rule may require that the scheduled patient is female. Rules may also be used to check the format of data (e.g. requiring data to adhere to a date/time format), or the validity of data (e.g. requiring that data have a valid checksum or expiration date). In general, the one or more rules may include any rule for validating a software application. Other data validation rules may include validating data in relation to other data (e.g. validating that a patient for a prostate procedure is male).

Validation rules may be used to validate and/or check, at least in part, a design element, such as design elements 216 included in specification 214. A validation rule may, for example, be used to validate and/or check a process action. The validation rules may be used to ensure that the process definition adheres to a possible order of actions, for example. The validation rules may also provide information used to validate and/or check a process action. For example, if a process action includes the action of setting a date and time for a medical procedure, the validation rules may be used to ensure that the setting of a date and time actually takes place and is included as part of the process action. Additionally or alternatively, the validation rules may be used to ensure that the date and time for the medical procedure are a valid date and time. The validation rules may also provide information used to validate and/or check a data definition. For example, if a data definition defines a medical insurance number, the validation rules may be used to ensure that the insurance number is a valid insurance number. As another example, the validation rules may be used to ensure that the insurance number conforms to a particular pattern, such as a maximum length, a required combination of alpha and numeric characters, or a required pattern of spaces or dashes between numbers, for example. The validation rules may also provide information used to validate and/or check one or more data relationships between data. For example, if a data relationship requires that a first data and second data are identical, the validation rules may include the requirement that the first and second data be identical, or may provide information used to ensure that the first and second data are identical, for example. The validation rules may also create additional restrictions upon a data relationship. For example, if data represents a hysterectomy, there may be a requirement within design definition 106 that an associated patient is female. Accordingly, specification 214 and/or design elements 216 may include a validation rule used to ensure that the patient associated with the hysterectomy is actually female, for example.

The validation rules may also contain process control rules. Process control rules may include criteria used to validate a process action. For example, if a process action includes the scheduling of a medical procedure. The one or more rules may be used to ensure that the scheduling occurs on a date that the surgeon is available. As another example, if a process action defines the receipt of a shipment, the one or more rules may also be used to check a purchase order number associated with the shipment, to ensure that the shipment is not scheduled for a holiday, or to validate any data or information associated with the receipt of the shipment. The one or more rules may also be used to validate entry criteria associated with a process action. For example, the shipping of goods may trigger a process action that creates an invoice. The rules may be used to ensure that the invoice is not created until the goods are shipped. Additionally/alternatively, the rules may be used to validate an exit criteria associated with a process action. For example, a rule may be used to ensure that an invoice is not closed until full payment is received. The one or more rules may be used to validate control flow of one or more process actions. For example, the one or more rules may also be used to ensure the transfer of control to an email notification process action when an order is placed over the Internet. A rule specifying a button to control the next page to appear from a set of web pages that constitutes at least a part of a user interface may be a further example of a process control rule. Any or all of the one or more rules are process control rules may control the processing of the process actions and may be captured 208 as at least part of specification 214. The rules may, for example, be captured 208 as one or more of design elements 216.

Design definition capturing process 102 may validate 218 the consistency of specification 214. Validation rules that may include, for example, a rule for determining the consistency of specification 214. It is possible that some information within design elements 216 may not be consistent with other information within design elements 216. Design definition capture process 102 may therefore contain one or more validation rules that may be used to safeguard against the possibility that some information within design elements 216 is inconsistent. For example, a design element 216 may contain data and information to define a user interface of a software application. The data and information may specify that a window border must be a particular width—a width of three pixels, for example. However, another design element 216 may contain a requirement that the same window border must be five pixels wide, for example. A validation rule may be included within design elements 216 to ensure that any and all window pixel width definitions are consistent. The validation rule may be used to accomplish consistency between design elements 216 in various ways. Continuing the pixel width example, a validation rule may require that only one pixel width definition exists within specification 214. Additionally/alternatively, a validation rule may require that, if more than one pixel width rule exists, then the pixel width rules must contain the same width value.

Design definition capturing process 102 may validate 218 specification 214 to ensure specification 214 is a controlled specification. A controlled specification 214 may be one in which process controls (e.g. UI elements, process actions, process flows, etc.) are present, complete, valid, and/or provide processes for use as at least part of a software application. A controlled specification may also be a specification that is preserved/stored within a revision control system such as CVS™ or IBM™ Rational™ ClearCase™, for example.

Validation rules may include, for example, a rule ensuring that specification 214 is a controlled specification.

Design definition capturing process 102 may validate 218 the consistency of specification 214. The validation rules may include a rule for validating/checking the consistency of specification 214. For example, if a process element specifies that a software application should prompt a medical technician to enter data, a validation rule may not only check that the entering of data is included in a process element, but may also check that design elements 216 include a user interface element for prompting the medical technician to enter the data. As one skilled in the art will recognize, the validation rules may employ various methods of ensuring the consistency of specification 214 including, but not limited to, ensuring design elements do not contradict each other, ensuring design elements are complete, ensuring design elements contain consistent rules or data, and ensuring invalid design elements do not exist, etc.

A validation rule may also include a rule for ensuring data within software design definition 214 and/or design elements 216 is validated. The validation rule may provide information used to validate and/or check a data definition. For example, if a data definition defines a medical insurance number, a validation rule may be used to ensure that a rule to validate the insurance number exists as a design element 216. As another example, a validation rule may be used to ensure that the insurance number conforms to a particular pattern, such as a maximum length, a required combination of alphanumeric characters, or a required pattern of spaces or dashes between numbers also exists as a design element 216, for example. The validation rule may also provide information used to validate and/or check one or more data relationships between or among data. For example, if a data relationship requires that a first data and second data are identical, the one or more rules may include the requirement that a rule exists to ensure that the first and second data are identical, or may provide information used to ensure that the first and second data are identical, for example. The validation rule may also include or create additional restrictions upon a data relationship. For example, if data represents a hysterectomy there may be a requirement within specification 214 and/or design elements 216 that a rule exists to ensure that an associated patient is female. Software design elements 216 may include a validation used to ensure that the patient associated with the hysterectomy is actually a female patient, for example.

Validation rules may include rules to validate a process definition. As discussed, Design definition capture process 102 may capture 210, at least in part, a process definition. Accordingly, specification 214 and/or design elements 216 may contain one or more validation rules for validating the process definition. The one or more validation rule may contain one or more rules and/or limits to which the process flow must adhere. For example, the validation rule may contain a specific order of actions to be taken within the process flow. The validation rule may be used to ensure that the process flow adheres to the specific order of actions, for example. The validation rule may also provide information used to validate and/or check a process action. For example, if a process action includes the action of setting a date and time for a medical procedure, the validation rule may contain information used to ensure that the setting of a date and time actually takes place and is included as part of the process flow. Additionally or alternatively, the validation rules may be used to ensure that the date and time of the medical procedure are a valid date and time, for example.

The validation rules may contain information that may be used to determine whether design definition 212 and/or specification 214 is complete. As stated, specification 214 may be used to automatically generate a software application. If, for example, specification 214 includes a user interface definition, specification 214 may also include one or more validation rules to determine whether specification 214 includes a complete user interface definition. Continuing the example, specification 214 may include design elements 216 that define a user interface. However, a critical part of the user interface definition may be missing or omitted; design elements 216 may inadvertently be omitting critical data necessary for the user interface definition, such as a size or layout structure of the user interface. Accordingly, and especially if a size or layout is a critical element of the user interface, a validation rule may be used to ensure that the size or layout element is present within specification 214 and/or design elements 216. The validations rule may be used to ensure that specification 214 and/or design definition 212 are complete and not missing any necessary design element.

As stated, design definition capture process 102 may generate 220 one or more design elements 216 based, at least in part, on one or more of: one or more process flow definitions; one or more user interface definitions; one or more data definitions, and one or more rules. Design elements 216 may include participants and actions of non-application software process actions as well as the actions required of the application software to support automated and interactive process actions. Design elements 216 that pertain to automated and interactive process actions may be included as at least part of specification 214.

Various other data may also be included within design definition 212. Design definition capture process 102 may generate 220 one or more design elements 216 based on the data and/or information of design definition 212. For example, design definition 212 may include organizational data, such as an organizational chart. The organizational chart may define an organizational structure and reporting hierarchy of an organization, for example. An organizational chart may also include information about elements within the organization chart. For example, if the organizational chart contains information about people within an organization, design elements 216 may include information about the people within the organization including name, location, contact information, position information, etc. Design definition capture process 102 may generate 220 one or more design elements 216 based on the organizational chart and/or the information within the organizational chart. Design definition 212 may also contain information about a physical work facility. The information about a physical work facility may include data such as address, size, cost, capacity, occupancy, ownership, and/or any other information associated with a physical work facility. Design definition capture process 102 may capture 206 the work location, and any information associated with the work location as at least part of specification 214 and/or design elements 216.

Design definition 212 may also include a structural definition for specification 214. The structural definition may provide a structure or organization for specification 214 and/or design elements 216. In an embodiment, the structural definition may be an XML schema that defines, at least in part, the structure of specification 214 and/or design elements 216. One skilled in the art will recognize that, although an XML schema is used as an example, any structural definition may be used to specify the structure of specification 214 including, but not limited to: an XML schema, a document template, a stylesheet, a UML document, a database schema, etc.

A process flow definition may include or contain process actions. The process actions may take various forms including, but not limited to: a manual process action; an interactive process action; and a fully-automated process action. For example, the process of scheduling a medical procedure may include manual, interactive, and fully-automated process actions. A manual process action may include, for example, a step within a process that is manual, or executed by a user without the use of a computer. Continuing the example, the entering of patient information may be an interactive process action that takes place during the process of scheduling a medical procedure. A medical technician may gather information from a patient through the manual process action of asking questions of the patient, and the technician may input the information into a computer as an interactive process action. Design definition capture process 102 may capture 202 a process flow definition that includes the interactive process action of entering patient information, capture 204 a user interface for the interactive process action, capture 206 the data used by/for the process action, and capture 208 rules to validate the data and/or the process action. The process flow definition, UI definition, data, etc. may, for example, be captured 202, 204, 206 by design definition capture process 102 which may generate 206 one or more design elements 216 based on the process flow definition, UI definition, data, etc. Subsequently, one or more design elements 216 in specification 214 may be used to automatically generate a software application that includes at least the interactive process action of entering patient information.

A fully-automated process element may be a process action that is performed or executed in a fully automated fashion. For example, the reporting of an operating room schedule may be a fully automated process action. A software application may, for example, create such a report without input from a user. As with interactive process actions, fully-automated process may be used by design definition capture process 102 to generate one or more design elements 216. Subsequently, one or more design elements 216 in specification 214 may be used to automatically generate a software application that includes at least the automated process action of reporting an operating room schedule.

Process flow definitions may include various types of information. For example, process flow definitions may be associated with one or more of: an operating unit; a work location; a process action trigger; a validation rule; a process action; operating data; a data relationship; and/or a user interface definition. An operating unit may be, for example, a unit within a company, examples of which include: an engineering unit; a marketing unit; a security unit; a legal unit; a support unit; etc. An operating unit may also be a component of a device, such as a car controller including but not limited to: an anti-lock braking system; an engine limiter; traction control; etc. A work location may be information representative of or associated with a work location. A work location may include but is not limited to: a cubicle, an office, a desk, a manufacturing plant, an office building, a floor, a laboratory, or any other form of work location. Continuing the medical procedure example mentioned above, an operating room, an examination room, and/or a waiting room may be work locations associated with the process of scheduling a medical procedure. A process element may be associated with a process trigger. A process trigger may be an event or occurrence that signals or causes the execution or performance of at least part of a process. In general, a process trigger may preclude a process execution and/or cause a process execution. A process trigger may be, for example, a medical patient entering cardiac arrest. The patient entering cardiac arrest may trigger the process of providing emergency care to the patient, which may include the emergency process actions of: signaling first responders, emergency scheduling of an operating room, and/or emergency scheduling of surgical personnel, for example. The emergency process actions may be triggered and/or set off by the initial trigger of the patient entering a state of cardiac arrest.

A process action may include one or more actions to be accomplished as part of a process. For example, if a process flow definition defines the booking of an operating room, a process action associated with the booking of the operating room may include: creating a schedule entry for the operating room, requesting special equipment for the operating room, scheduling staff for the operating room, sterilizing the operating room prior to the medical procedure, etc. In general, a process action may be any discrete action associated with a process flow.

Design definition capture process 102 may also generate 222 one or more simulation definitions. Design definition capture process 102 may include the one or more simulation definitions as at least part of specification 214. For example, design definition capture process 102 may generate 220 design elements 216 based on the one or more simulation definitions. A simulation definition may include information and definitions for simulating and/or testing a software application. For example, if specification 214 includes a definition of a software application for scheduling a medical procedure, specification 214 and/or design elements 216 may also include information for simulating the design definition for scheduling a medical procedure. A simulation definition may use design elements 216 for the process definition, process actions, user interfaces, data, and/or rules for simulating the software. A simulation definition may include, for example, data and/or procedures for stepping through the process of scheduling a medical procedure that may be used to simulate and test, but not actually perform, the process of scheduling of the medical procedure. The simulation data and/or procedures may include simulated schedules, simulated user input, simulated emergency procedures, simulated error conditions, simulated facilities, or any data or information that may be used to simulate the software application.

A number of implementations have been described. Nevertheless, it will be understood that various modifications may be made. Accordingly, other implementations are within the scope of the following claims.

What is claimed is:
1. A method, comprising:
capturing in computer memory one or more process flow definitions that define, at least in part, a software application;
capturing in the computer memory one or more user interface definitions that define, at least in part, an interface to the software application;
capturing in the computer memory one or more data definitions that define, at least in part, data used within the software application;
capturing in the computer memory one or more rules for validating at least part of the software application, wherein the one or more rules are selected from the group consisting of a rule for controlling the operation of the design definition, a rule for determining the completeness of the design definition, and a rule for determining the consistency of the design definition;
capturing in the computer memory a design definition as a specification wherein the design definition includes: the one or more process flow definitions; the one or more user interface definitions; the one or more data definitions; and the one or more rules;

validating automatically that the specification is a complete specification using the captured design definition; and validating automatically that the specification is a consistent specification using the captured design definition.

2. The method of claim 1 further comprising:
generating one or more design elements based, at least in part, on one or more of: the one or more process flow definitions; the one or more user interface definitions; the one or more data definitions; and the one or more rules.

3. The method of claim 2 wherein capturing the design definition as the specification includes capturing the one or more design elements as at least part of the specification.

4. The method of claim 1 wherein the one or more data definitions includes one or more items selected from a group consisting of:
user interface data elements;
an organization chart that identifies, at least in part, operating units and their hierarchy;
a work location that identifies, at least in part, a physical work facility; and
a hierarchy that defines the functional components of the design definition.

5. The method of claim 1 wherein the one or more process flow definitions include one or more process actions.

6. The method of claim 5 wherein each of the one or more process actions is selected from a group consisting of: a manual process action; an interactive process action; and an automated process action.

7. The method of claim 5 wherein the one or more process actions are associated with one or more of the group consisting of: an operating unit; a work location; a process action trigger; a user interface definition; data; a data relationship; and a validation rule.

8. The method of claim 1 further comprising:
generating one or more simulation definitions that define, at least in part, one or more simulations of the software application;
wherein the design definition further includes the one or more simulation definitions.

9. A computer program product residing on a non-transitory computer readable medium, having a plurality of instructions stored thereon, which, when executed by a processor, cause the processor to perform operations comprising:
capturing one or more process flow definitions that define, at least in part, a software application;
capturing one or more user interface definitions that define, at least in part, an interface to the software application;
capturing one or more data definitions that define, at least in part, data used within the software application;
capturing one or more rules for validating at least part of the software application, wherein the one or more rules are selected from the group consisting of a rule for controlling the operation of the design definition, a rule for determining the completeness of the design definition, and a rule for determining the consistency of the design definition;
capturing a design definition as a specification wherein the design definition includes: the one or more process flow definitions; the one or more user interface definitions; the one or more data definitions; and the one or more rules;
validating automatically that the specification is a complete specification using the captured design definition; and
validating automatically that the specification is a consistent specification using the captured design definition.

10. The computer program product of claim 9 further comprising:
generating one or more design elements based, at least in part, on one or more of: the one or more process flow definitions; the one or more user interface definitions; the one or more data definitions; and the one or more rules.

11. The computer program product of claim 10 wherein capturing the design definition as the specification includes capturing the one or more design elements as at least part of the specification.

12. The computer program product of claim 9 wherein the one or more data definitions includes one or more items selected from the group consisting of: user interface data elements; an organization chart that identifies, at least in part, operating units and their hierarchy; a work location that identifies, at least in part, a physical work facility; and a functional hierarchy that defines the functional components of the software design.

13. The computer program product of claim 9 wherein the one or more process flow definitions include one or more process actions.

14. The computer program product of claim 13 wherein each of the one or more process actions is selected from a group consisting of: a manual process action; an interactive process action; and an automated process action.

15. The computer program product of claim 13 wherein the one or more process actions are associated with one or more of the group consisting of: an operating unit; a work location; a process action trigger; a user interface definition; data; a data relationship; and a validation rule.

16. The computer program product of claim 9 further comprising:
generating one or more simulation definitions that define, at least in part, one or more simulations of the software application;
wherein the design definition further includes the one or more simulation definitions.

* * * * *